United States Patent [19]
Forrest et al.

[11] 3,911,587
[45] Oct. 14, 1975

[54] JAG SYSTEM FOR MARKING DENTAL INSTRUMENTS FOR DEPTH PENETRATION

[76] Inventors: John Orchover Forrest, 6, Harcourt House Cavendish W. 1; Adrian Harold Redfern Rowe, 137, Sydenham Hill S.E. 23, both of London, England

[22] Filed: Dec. 28, 1973

[21] Appl. No.: 429,119

[52] U.S. Cl. ............ 33/174 R; 33/168 R; 33/174 H; 33/201
[51] Int. Cl.² .......................................... G01B 5/02
[58] Field of Search .......... 33/174 D, 174 R, 174 H, 33/168 R, 169 B, 201; 32/40

[56] References Cited
UNITED STATES PATENTS
1,157,389  10/1915  Hess.................................. 33/168 R
3,675,335  7/1972  Forster............................. 33/168 R OTHER PUBLICATIONS
"American Machinist" – Jan. 12, 1959; p. 138, Title – Standard For Depth Micrometers.

*Primary Examiner*—Richard E. Aegerter
*Assistant Examiner*—Willis Little
*Attorney, Agent, or Firm*—Darbo, Robertson & Vandenburgh

[57] ABSTRACT

For setting the dental instruments to be used in the root canals, reference devices formed with a range of blind bores of predetermined depths covering the known range of root canal depths are provided, into a selected one of which an instrument to be used in an operation can be inserted for setting the marker on the instrument.

2 Claims, 6 Drawing Figures

JAG SYSTEM FOR MARKING DENTAL INSTRUMENTS FOR DEPTH PENETRATION

BACKGROUND OF THE INVENTION

In dental operations on the root canals of teeth, it is necessary to set markers on the instruments to be used to define their depth of insertion into the canal to the predetermined depth of the canals. The setting of the markers has previously been carried out by scale measurement which is time consuming.

SUMMARY OF THE INVENTION

The present invention relates to the provision of reference devices by means of which the markers on dental root canal instruments can be instantly set.

DESIGNATION OF THE FIGURES

DESCRIPTION OF SPECIFIC EMBODIMENT

The mechanical preparation of root canals is an extremely important part of root canal treatment. It is necessary to establish the length of the canal at an early stage in the treatment and to prepare the canal for this measurement. Root canal instruments must be adjusted to this working length by the use of rubber or plastic markers or stops, or by adjusting test handles. This is normally undertaken by measuring each instrument with a millimeter rule.

The axial length of root canals in teeth varies widely and in order to adjust the length of the instrument to be introduced into the canal it is necessary to determine the length of the canal. For this purpose a radiographic determination is made of the length of the canal in well known manner and the instruments to be used in the canal are set to the length so determined.

For this technique to be efficient, it is now proposed to have a series of dimensional standards for a predetermined range of canal lengths instead of setting each instrument with a rule. The standards can be in any desired form of reference apparatus provided with blind bores of a predetermined range of depth suitable for immediate use, but the presently preferred form is a set of rods or pillars with blind bores of the respective lengths (depths) axially bored therein forming a set of jigs.

Figure 1:
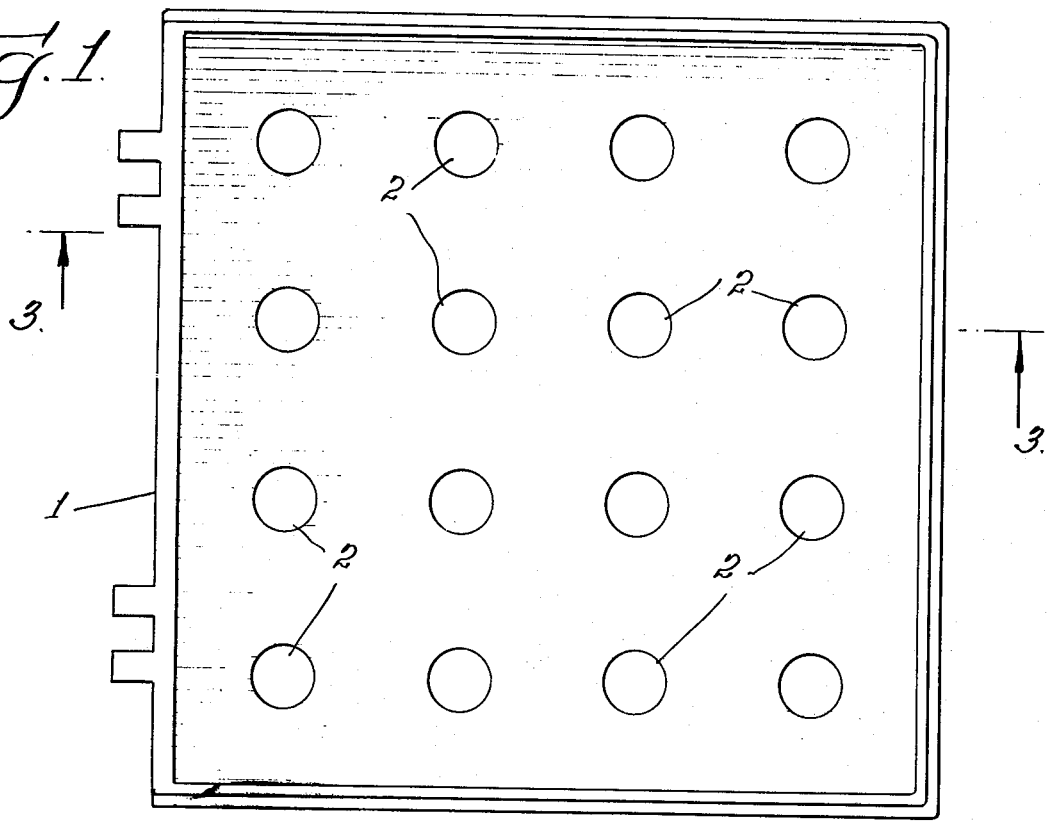
FIG. 1 is a plan view of a box, top removed, showing supporting means for an array of root canal depth reference devices.
Figure 2:
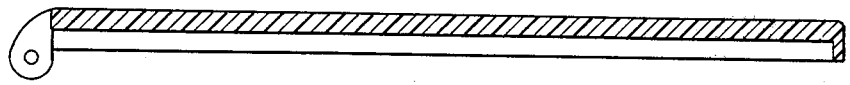
FIG. 2 is a cross-sectional view of the top of the box.
Figure 3:
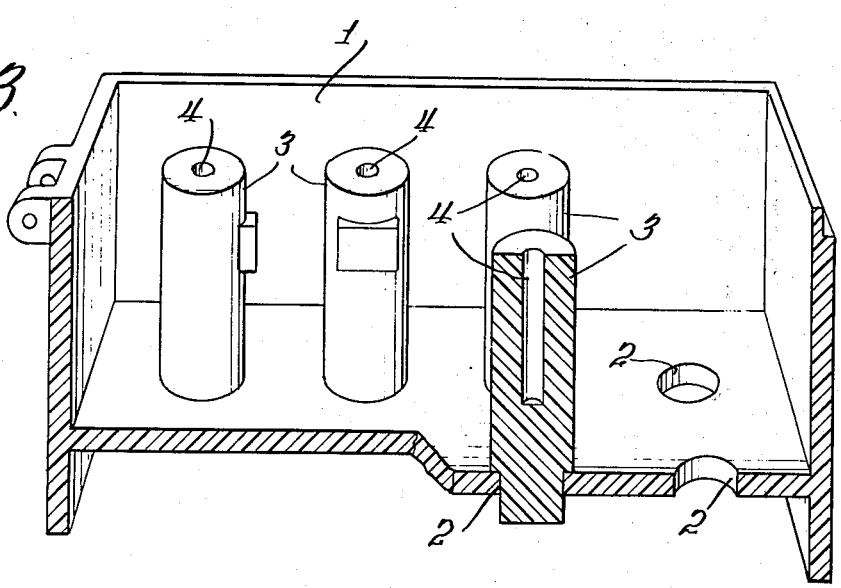
FIG. 3 is a perspective view, in cross section, taken at the line 3—3 of FIG. 1.

In FIG. 1, reference 1 indicates a transparent plastic box, top removed, approximately 10 cm. square and 5 cm. deep with a sliding lid. The base of the box has 16 dowel holes 2 into which removable clear plastic rods or pillars 3.1 mm. in diameter are fitted. Each rod contains a blind bore 4, FIG. 3, 1.5 cm. in diameter drilled to a known depth which varies from 15 to 30 mm. in increments between successive rods of 1 mm. The length of the hole is marked on each rod and on the base-plate of the box, FIG. 1.

Figure 4:
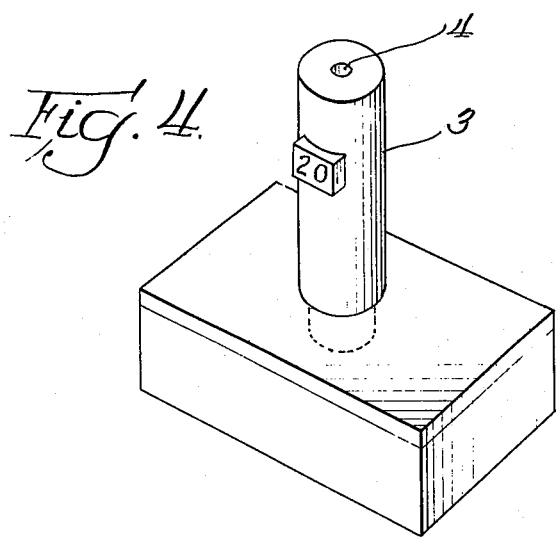
FIG. 4 is a perspective view of an individual stand having a root canal depth reference device mounted therein.
Figure 5:
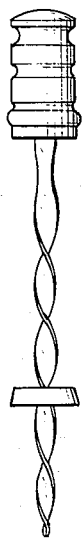
FIG. 5 shows a typical root canal instrument with a marker preliminarily placed thereon.

When the length of the canal has been established in the manner described above, the rod 3 marked, as at 5, with the determined length is removed from the box and placed in a separate plastic stand 6, FIG. 4. A marker 7 is placed near the tip of each instrument 8 (reamer, file, broach or point) which is to be measured as shown in FIG. 5.

Figure 6:
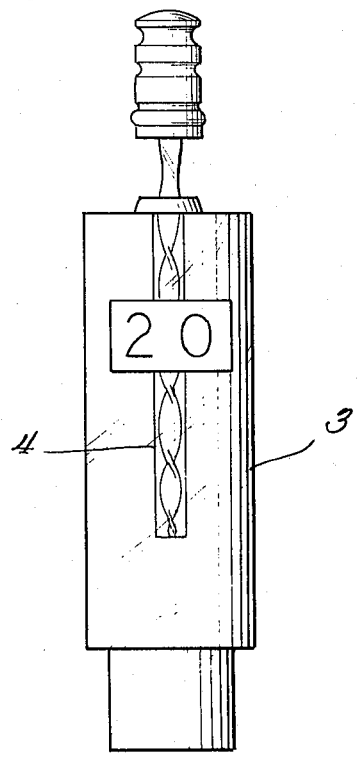
FIG. 6 is an elevational view of a depth reference device with a root canal instrument therein and showing the marker in position.

The instrument is inserted into the bore in the selected rod so that its point gently touches the bottom of the bore. The marker 7 will automatically be pushed up the shaft of the instrument to the correct length, see FIG. 6. It may be necessary with some markers to make a separate adjustment.

It should be possible to prepare all the instruments required for a root canal preparation in a few seconds before treatment is commenced. At the completion of treatment the used rod 3 may be placed in a cold sterilizing solution and returned to the box.

The apparatus described provides a very simple and rapid method of adjusting the length of root canal instruments.

The set of rods or pillars could be replaced by, or augmented by, a single integral block formed with a complete range of blind bores and a plurality of blocks each formed with any desired group of individual blind bores. This technique could be used in the measurement of other blind bores in the body, in nature, or in manufactured articles or structures.

The embodiments of the Invention in which an exclusive property or privilege is claimed are defined as follows:

1. The method of marking root canal dental instruments for depth penetration into a particular root canel which comprises the steps of first determining the length of the root canal, then selecting the one of a set of blind bore jigs which has a bore equal in depth to the length of the root canal, placing a frictionally engaging annular marker on the instrument to be marked near the tip thereof, forcing the instrument into the bore of the jig while the marker is stopped by the end of the jig until the tip of the instrument engages the bottom of the bore, and thereafter withdrawing the instrument with the adjusted marker thereon from the bore of the jig.

2. The method of claim 1 and including the additional step of withdrawing the selected jig from the set and mounting it in a separate stand whereby the jig may be located on the dentist's chair tray for use in marking each of several root canal instruments as they are required and prepared for use.

* * * * *

UNITED STATES PATENT AND TRADEMARK OFFICE
CERTIFICATE OF CORRECTION

PATENT NO. : 3,911,587
DATED : October 14, 1975
INVENTOR(S) : John Orchover Forrest and Harold Redfern Rowe It is certified that error appears in the above-identified patent and that said Letters Patent are hereby corrected as shown below:

In the title of the patent (both occurrences), "Jag" should be --Jig-- so that the title will read, "Jig System for Marking Dental Instruments for Depth Penetration".

Col. 2, l. 42    "canel" should be --canal--

Signed and Sealed this twenty-seventh Day of January 1976

[SEAL]

Attest:

RUTH C. MASON
Attesting Officer

C. MARSHALL DANN
Commissioner of Patents and Trademarks